May 6, 1969 E. J. RAMALEY ET AL 3,443,056
METHOD AND APPARATUS FOR NON-DESTRUCTIVE TESTING
OF RESISTANCE WELDS
Filed June 29, 1964 Sheet 1 of 4
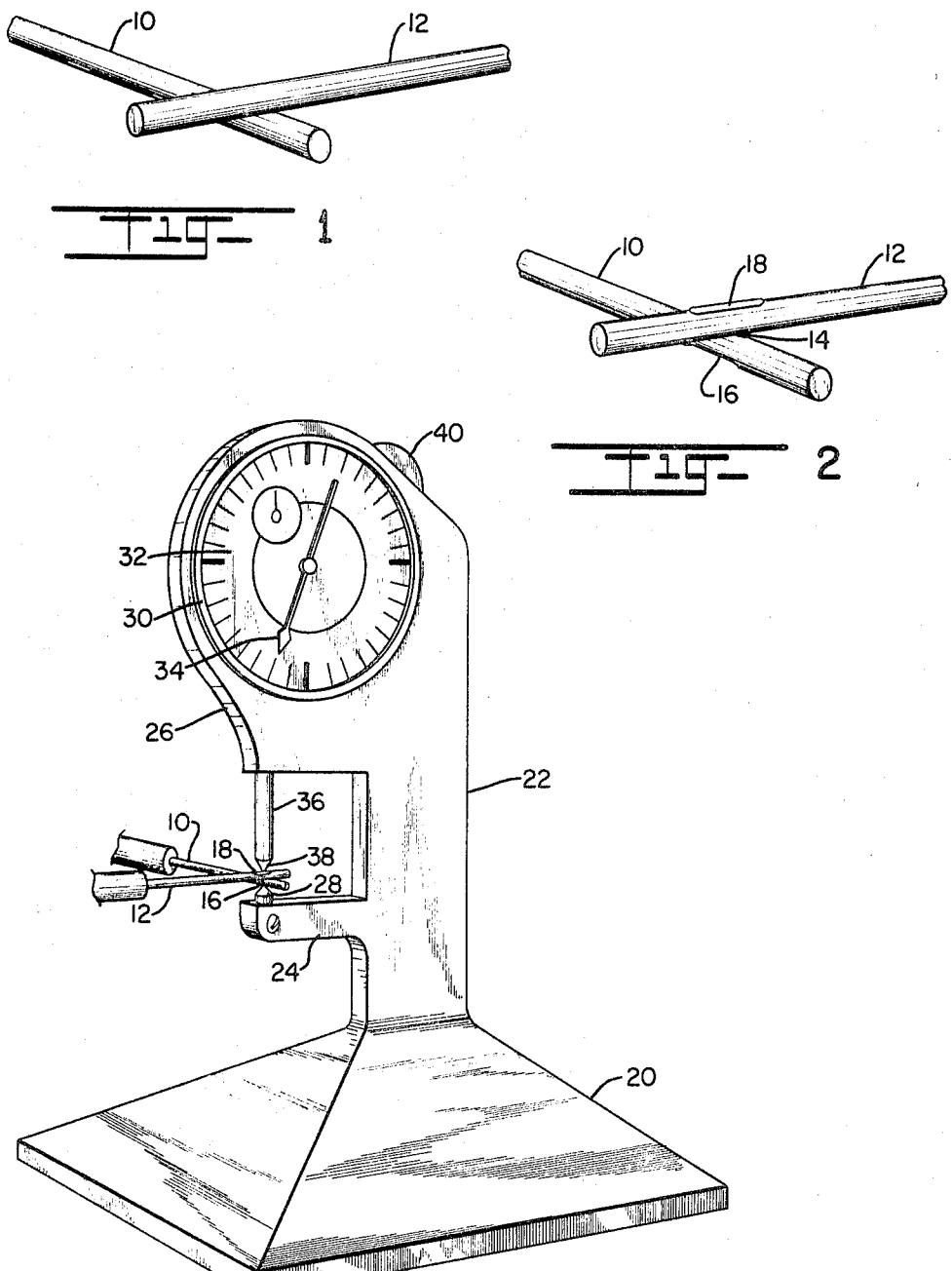
INVENTOR.
EDWARD J. RAMALEY
NORMAN G. WILCOX
BY
Sheridan and Ross
ATTORNEYS

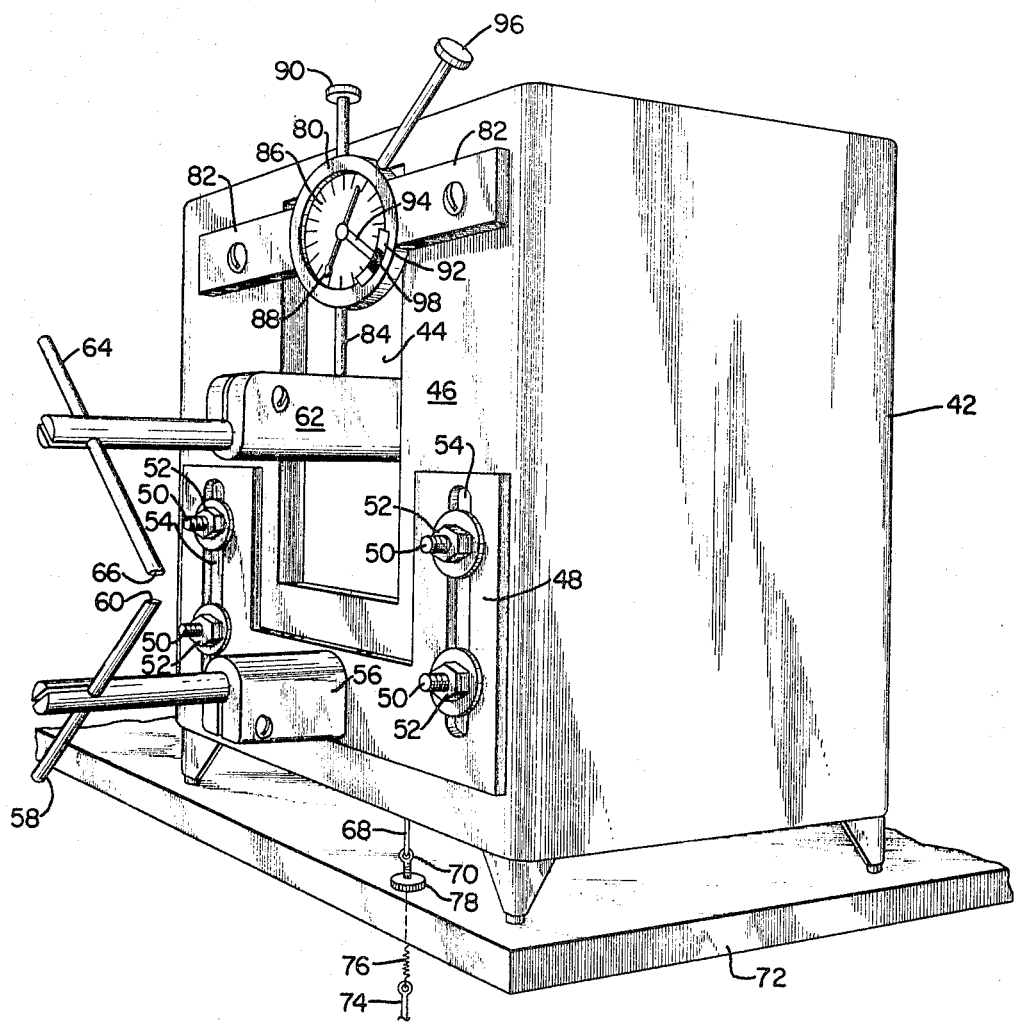

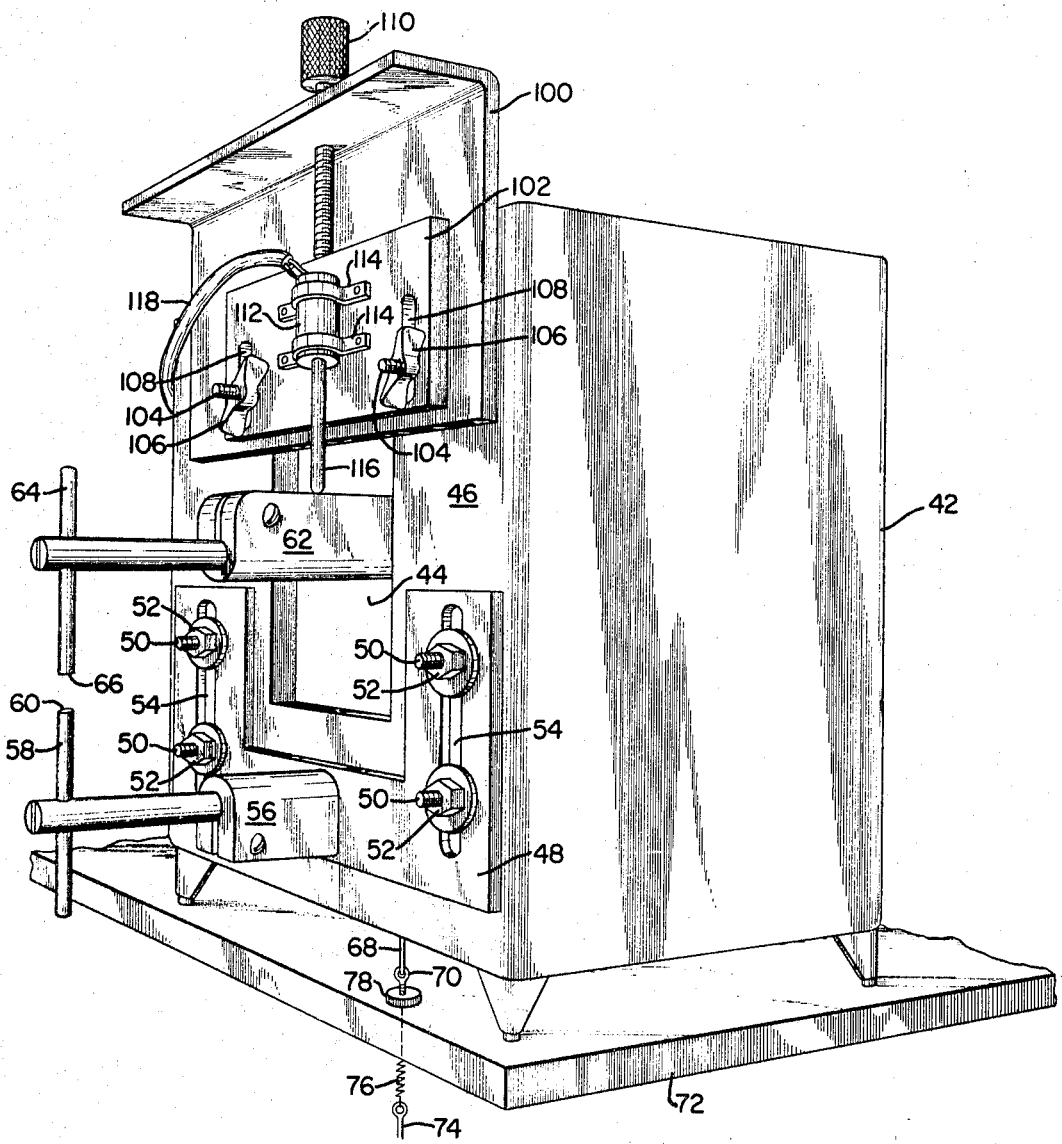

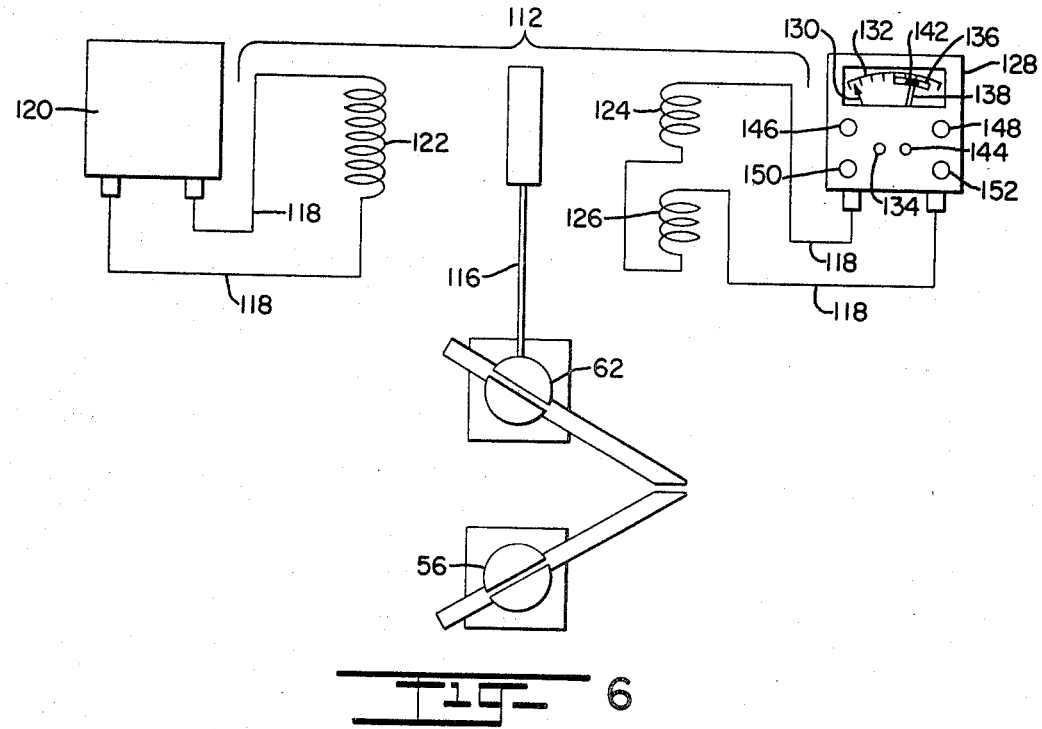
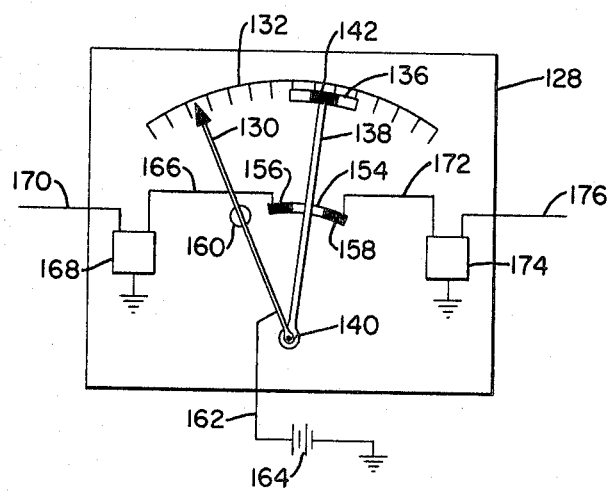

United States Patent Office 3,443,056
Patented May 6, 1969

3,443,056
METHOD AND APPARATUS FOR NON-DESTRUCTIVE TESTING OF RESISTANCE WELDS
Edward J. Ramaley, Denver, and Norman G. Wilcox, Littleton, Colo., assignors to Martin-Marietta Corporation, Baltimore, Md., a corporation of Maryland
Filed June 29, 1964, Ser. No. 378,902
Int. Cl. B23k 11/24, 37/04
U.S. Cl. 219—109         13 Claims

ABSTRACT OF THE DISCLOSURE

It has been discovered that non-destructive testing of friction welded joints can be accomplished by measuring the reduction in thickness in the joint of the parts welded resulting from the welding operation and comparing the reduction in thickness to a standard reduction which was predetermined to indicate acceptable weld quality. The apparatus for carrying out the discovered method includes means for measuring the downward movement of the movable electrode which provides a signal which is proportional to the reduction in thickness of the parts welded. Mechanical or electrical means compare the signal so generated with a standard which was predetermined to provide an acceptable weld quality. The comparison can be made visually, acoustically, etc.

---

This invention lies in the field of resistance welding and more particularly is directed to a method of testing welds or welded joints without destroying them, so that satisfactory parts retain their utility, and to apparatus for practicing the method.

While the present invention is capable of use in testing the quality of resistance welds between pieces of any kind, type, or size of weldable material, it finds a particularly high degree of utility in the field of electrical or electronic circuitry, wires, ribbons, etc., incorporated in electronic modules. These devices, as presently being miniaturized, are small and rather delicate and employ very small wires or ribbons, and in some cases thin sheets, which are welded together at a multitude of points, primarily by resistance welding.

In the normal routine, two or more wires or ribbons are arranged to cross each other at a substantial angle and are placed in a welding zone with the intersection of the elements lying between the electrodes, of which usually one is fixed and the other is movable. The electrodes are moved toward each other to bring their points in contact with the assembly and apply a predetermined pressure. A predetermined potential is then applied across the assembly to pass current therethrough for a predetermined length of time which has been found to be sufficient to produce local melting and flow at the points of contact, resulting in fusion of the elements.

Welds made in this general manner are basically very satisfactory and the method described has been widely adopted. So long as the quality of the material is consistent and the amount of pressure and heat applied are kept constant, the welds are quite uniform and satisfactory performance is assured. The wire or other weldable material can usually be inspected in bulk so that the uniformity of large quantities can be determined easily and quickly. The pressure applied by the electrodes can be maintained very constant with ease and it has been found that variations in pressure well beyond a tolerance which can be easily maintained do not affect the quality of the welds to an appreciable extent.

Experimental work and general experience have shown that the three criteria mentioned above almost solely determine the quality and uniformity of the welds. Since the material and the electrode pressure are readily controlled the quantity of heat applied becomes the factor of most concern. Hence, for every combination of size and type of wire or other element to be joined, a weld schedule is made up which specifies the pressure applied to the assembly and the quantity of heat energy applied to it. Suitable voltages are selected and time of application specified. The energy is actually considered in terms of watt-seconds and normally the machines are set and continually monitored to keep this value as constant as possible for the series of identical joints which are to be made.

Even though the system set forth would appear to guarantee uniformity over long periods of time, testing of samples has shown that there are variations in quality and strength of weld beyond allowable limits. While the causes are not positively and exactly known it has been determined that one element to be considered is the possible discrepancy between the watt-second output of the welding machine and the actual watt-seconds in the weld itself. This discrepancy can result from any of various causes such as dirt or corrosion at the point of contact, variation in conductivity of the material, etc. It will be appreciated that even with absolute uniformity of watt-second output from the machine there is always a possibility of variation in the watt-second input to the weld itself. Hence, some kind of testing must be carried out regularly.

Visual inspection of every part or joint is, of course, usually a part of the total inspection procedure. While such inspection can tell that the part "looks like it should," it cannot positively tell if it "is what it should be." The joints in electronic modules used in aircraft, missiles, and space vehicles, while rather delicate, are still subjected to relatively great stresses as a result of vibration or twisting or pulling loads. Thus they not only have to conduct well as made but they must retain their integrity under a variety of loadings so that they will not fail their mission at a critical moment. As a consequence many manufacturers have adopted the policy of pull testing representative samples at regular intervals to determine the ultimate strength of the weld.

While these pull strength tests are fairly consistent and give a fairly good idea of what comparable production parts will do in the way of quality they still have various disadvantages. One of these is that they are tests to destruction. Actual circuitry cannot be used because of this, and test weld joints are made of materials which are as nearly duplicate as possible. If the tests represent only a small percentage of production parts then the sampling is not as useful as desired. As the percentage of sampling increases, so do the waste of materials and the costs. In addition, since the samples are not the parts, there is always the question of just how identical they are.

The present inspection method and apparatus to enable it to be carried out overcome the difficulties outlined above. The method is non destructive, it is consistent, and it can be applied readily to one hundred percent of the production parts. The method is based on the determination that when sets or groups of elements—wire, ribbon, etc.—of identical materials having identical dimensions are resistance welded between electrodes exerting the same pressure on the assembly and applying the same heat energy to it, the amount of reduction of thickness, or "setdown," of the joint from pre-weld is remarkably consistent, the variation running only slightly over one percent. The pull tests of the same sets, which would normally represent the basic inspection technique, have a wider variation but are consistent enough to serve that purpose, as attested by the general acceptance of pull test inspection at the present time. Moreover the pull test results are comparable to the thickness reduction results when experiments are made with groups of different kinds or sizes of materials. Thus, it has been established that measurement of the thickness or thickness reduction of a weld joint and comparison with the measurements of similar joints and with a standard constitute a very accurate method of judging the consistency and quality of production welded joints.

The method basically comprises selecting appropriate electrode pressure and amount of input of heat energy for any group of materials from experience, producing one or a quantity of welds and determining that they fall within the quality limits allowed, determining the amount of thickness reduction or setdown which has occurred, setting this reduction as a standard, and comparing the reductions of each production joint to the standard to determine whether or not the joint is acceptable.

The reduction or setdown may be taken linearly or in percentage in most cases. The true test is the percentage of reduction which reflects the plastic metal flow, and extreme accuracy would call for this basis of measurement. However, a separate, empirical standard must be determined for every combination of size and type of material, and is to be used only for checking identical groups or sets. Therefore, a standard in linear terms will serve as well and simplify determination. Moreover, a first quality joint is good enough so that a fair tolerance on both sides of the standard dimension can be allowed and this tolerance will encompass the results of slight variations in initial dimensions.

As a practical matter the final thickness dimension may be taken as the standard since it is always applied to the same thickness of original combination and therefore represents or reflects the total thickness reduction. The only time it is ordinarily necessary to resort to percentage measurements is when the gage of the wire, etc. varies beyond the normal limits but is not bad enough to reject or must be used for some pertinent reason. In such case percentage will take care of the variation rather closely although it is recognized that substantial variations in wire size will modify the effective watt-second input to the weld, and will also modify the watt-second input needed. However, circumstances of this kind do not affect the basic theory of the method or its utility. Thus the reduction in thickness mentioned above and hereinafter is to be understood as being linear or percentage as called for by the work at hand, and is considered to be complementary to the final post-weld thickness.

The practice of the method does not call for any change in the welding procedure or in the welding machine itself, although in some cases attachments may be added to standard welding machines as explained hereafter. In the simplest form of the practice of the method, as each welded joint is taken from the welding zone a standard micrometer with pointed anvils is applied to the joint and its final thickness is determined. This figure is compared with that of the standard and, if it falls within the tolerance limits of the standard measurement, it is accepted. The same type of measurement may be accomplished with a simple yoke having a fixed jaw and anvil and a dial indicator. The axially movable shaft of the indicator serves as the movable jaw of the yoke.

The inspection may be further simplified and made substantially simultaneous with the welding itself by mounting a dial indicator on the welding machine in such position that its shaft contacts the movable electrode and indicates its change of position in a direction axial of the shaft. The initial reading is noted when the group or set of elements has been positioned in the welding zone and the electrodes have been pressure loaded against them. Current is then passed through the elements and, under the electrode pressure, flow and fusion take place and the final weld spot or joint is thinner than the original assembly of elements. The movable electrode follows the setdown of the weld and the dial indicator shows the amount.

A more sophisticated but still relatively simple arrangement for simultaneous inspection includes the provision of a linear differential transformer mounted on the welding machine in such position that its armature follows the movable electrode in the same way as the shaft of the dial indicator above described. The output of the transformer is applied to a bridge voltmeter which may be calibrated to read directly in linear or percentage units. The voltmeter or the voltage signal may actuate visible or audible signals in addition.

The invention outlined above provides a system for checking the actual production welds rather than sample special parts which must be presumed to be the same as the production parts, and the system can be applied to one hundred percent of the production parts at almost no cost in time or money. A matter of considerable importance is that since every weld is checked and this is done immediately, any malfunction of the welding machine is discovered and corrected promptly with practically no loss of production parts.

Various other advantages and features of novelty will become apparent as the description proceeds in conjunction with the accompanying drawings in which:

FIGURE 1 is a perspective view of a pair of typical wires juxtaposed and ready for welding;

FIGURE 2 is a view similar to FIGURE 1 showing the completed joint after welding;

FIGURE 3 is a perspective view of a yoke stand incorporating a dial indicator for measuring setdown;

FIGURE 4 is a perspective view of a conventional welding machine head with stationary and movable electrodes and a dial indicator to read the position of the movable electrode;

FIGURE 5 is a similar view of a similar machine but incorporating a linear differential transformer to read the position of the movable electrode;

FIGURE 6 is a schematic representation of the machine of FIGURE 5 with a power source and a reading device for the transformer; and FIGURE 7 is a schematic representation of the voltmeter of FIGURE 6 incorporating special indicating devices.

As indicated in FIGURES 1 and 2, the welding process itself is conventional. A pair of wires 10 and 12 is arranged in angular juxtaposition and in contact, as shown in FIGURE 1. The wires may be the same size, shape, and material or they may differ. Wire can be secured to ribbon or sheet etc. Normally only two elements are welded together, but the welding process and the inspection process are applicable to groups or sets of more than two elements.

The juncture of the elements is placed in the welding zone between a pair of electrodes, not shown, which apply pressure to urge the elements into intimate contact. Current is then passed from one electrode to the other through the juncture, and the resistance at this point raises the temperature of the metal in the localized zone to the melting point. Continued pressure causes the metal to flow away from the pressure points as the elements fuse together into a single welded joint as seen in FIGURE 2. A small amount of metal 14 is forced out of the contact areas and the elements now have flats 16 and 18 produced by the electrodes. The final total joint is appreciably thinner than the sum total thickness of the elements in their pre-weld form.

The key to the new method of inspection is the fact that the setdown or reduction of thickness, is reproducible indefinitely if the properties of the material, the pressure, and the heat energy input are kept constant. Within somewhat wider limits because of irregularities in test procedures, the pull strength tests on the weld joints are also reproducible. This means that with a given set of elements and given welding procedures the setdown bears a constant relation to the quality or strength of the weld and can therefor be used as a direct indication of the weld quality. Substantial variations in the setdown usually indicate variations in material quality or condition, electrode pressure, or heat energy input. Since the first two are more controllable, the latter is usually the source of the difficulty.

When production or facilities are limited, the inspection can be carried out with an ordinary micrometer with pointed anvils which can reach to the true low points of the weld spots. The first stage of the method consists in making a series of welds as described with all conditions as constant as possible. Preliminary work will have indicated the proper pressure and heat energy input so that the pull strength of all of the samples should be within acceptable limits. The pull strengths and setdowns are now correlated and a standard is determined which specifies a particular setdown as ideal with upper and lower tolerances which are found to be acceptable. In some cases a single example can be used if it is made with exactly dimensioned elements and under optimum conditions. As explained above in detail, because there is a standard for each combination or group of elements it may be expressed as percentage reduction of thickness, linear reduction, or linear final thickness. Normally the tolerances are such that the difference in systems will not be important.

Once a standard has been set for any given combination of elements, the production parts may be run off in as long or short a series as desired. Each joint is measured, preferably promptly after welding and the measurement is then compared with the other production parts and with the standard. If it is within the tolerances it is accepted. If not, it is rejected. Any such rejection obviously calls the operator's attention to the need for checking the material, the machine, and the process to locate the trouble. This check can be made promptly to avert the production of additional defective parts.

A rather simple apparatus for determining setdown is illustrated in FIGURE 3. Base 20, suitable for mounting on a table top, is provided with a vertical standard 22 carrying a horizontally extending arm 24 and a head 26. Arm 24 carries a pointed anvil 28 to engage bottom flat 16 of the joint to be measured. Head 26 carries a conventional dial type gage 30 having a dial 32 and a pointer 34 as well as an axially movable shaft 36 provided with a pointed anvil 38 to engage upper flat 18 of the joint. The neutral or zero reading may be adjusted as desired by operation of thumbwheel 40.

When a series of joints of a given type is to be checked, the standard is determined. A thickness gage corresponding to the total pre-weld thickness of the elements is inserted between anvils 28 and 38 and the dial gage reading is noted. If desired, the reading may be set to zero or it may be set so that the desired thickness after welding will produce a zero reading. This is a matter of choice or convenience. Thereafter each production joint is set between anvils 28 and 38, the amount of thickness reduction is determined by reference to the gage, and it is compared with the standard for acceptance or rejection.

The same general idea may be applied directly to the welding machine so that the thickness reading can be taken as soon as the weld is completed, and the extra step of transfer to an inspection station is eliminated. The arrangement is illustrated in FIGURE 4 in which the welding head includes a casing 42 having a vertically extending opening 44 in its front wall 46. A support bracket 48 is vertically slidably mounted to the front wall by means of bolts and nuts 50, 52 and adjustment slots 54 and carries lower electrode 56 which has a rearward extension, not shown, passing into the interior of the casing. While the plate is adjustable, it is fixed during operation and hence this electrode is considered as fixed or stationary. Electrode 56 carries an electrode rod 58 having a welding point or tip 60 which is sized and shaped for the particular job to be done.

Extending fore and aft through opening 44 is the upper electrode 62 which is mounted by means not shown for vertical movement in the opening. At its outer end it carries electrode rod 64 having a suitable tip 66 to oppose tip 60. In use, tips 60 and 66 clamp between them the elements to be welded and apply a predetermined pressure to insure intimate contact. To apply this pressure, tension rod or cable 68 is connected to electrode 62 by means of a tension spring within the casing. Rod 68 is attached to eye bolt 70 which passes through table top 72 and is secured to tension rod 74 preferably by means of a coil spring 76.

To set the desired pressure, tension rod 74 is pulled down by pressure of the operator's foot on a pedal, not shown, and the force is transmitted through the two springs, which have a rather high rate. When the pressure reaches the desired value, thumb nut 78 is run down on eye bolt 70 until it abuts table top 72. Once this is set, the operator can press the pedal freely without exceeding the proper pressure at the electrode tips. In operation a group of elements is placed between tips 60 and 66, the pressure is applied as just described, and a surge of current is passed through the elements at their junction for a predetermined length of time in a normal welding procedure. Since the joint is reduced in thickness, the loaded electrode will move down a corresponding amount and this gives a basis for the desired measurement.

A dial gage 80 is mounted to front wall 46 near the upper end of opening 44 by means of brackets 82 and has an axially movable shaft 84 which contacts electrode 62 and follows its vertical movement. The gage is provided with the usual scale 86 and pointer 88 as well as knob 90 to set the neutral reading. To set the gage, the electrodes are clamped on a group of joint parts or on a thickness gage of the same dimension, and the pointer is set to zero. When a joint is formed the shaft 84 follows electrode 62 and moves the pointer. The new reading indicates the setdown or reduction of thickness and this is compared with the standard for this combination of elements. Thus the inspection is made substantially simultaneously with the weld.

The inspection may be further facilitated by the addition to the dial indicator of a standard range plate 92 mounted on arm 94 to rotate about the same axis as the pointer in response to the adjustment knob 96. The range plate carries a central zone or section 98 contrasting with the balance of the plate to indicate the range of tolerance of the readings. In practice, the scale 86 and pointer 88 are set as mentioned above. By reference to the standard which has been previously determined, the standard range plate is now adjusted to such position that if a weld is of the proper thickness point 88 will be in zone 98 at about its center. If all subsequent welds are satisfactory then the pointer will be somewhere in zone 98 after each weld. This greatly simplifies the operator's task.

The welding head of FIGURE 5 is substantially the same as that of FIGURE 4 but different means are provided for reading the movement of the upper electrode. A bracket 100 is mounted on front wall 46 at its upper end. A second bracket 102 is mounted on the front face of bracket 100 by bolts 104, wing nuts 106 and slots 108. Adjustment screw 110 raises and lowers bracket 102, and wing nuts 106 are tightened to hold it in adjusted position.

A linear differential transformer 112 is held in a vertical position on the front face of bracket 102 by clamps 114, and axially movable armature 116 extends downwardly from the transformer to contact electrode 62 and follow it up and down in the same way as shaft 84 in FIGURE 4. Conductors 118 lead to a power source and an indicator, shown in FIGURE 6. The armature serves as a movable core in the transformer and varies its output voltage in accordance with its axial position. The voltage, of course, varies in accordance with the thickness of the weld joint and readings of the voltage can be calibrated as desired, linearly or in percentage.

Turning now to FIGURE 6, the diagrammatic layout shows a power source 120 which in one preferred form is an oscillator operating at 2 kilocycles to feed power to a primary coil 122. A pair of opposed secondary coils 124 and 126 transmit their resultant voltage to a vacuum tube voltmeter 128, and pointer 130 registers on scale 132. Knob 134 is used to adjust the pointer to zero or any other desired reference point. As armature 116 follows electrode 62 vertically it extends more or less into the field of coils 122, 124, and 126 and varies the reading on the voltmeter. Scale 132 can be calibrated in linear or percentage units.

The voltmeter also is provided with a standard range plate 136 carried by arm 138 which is mounted for rotation about the same pivot 140 as is pointer 130. The range plate has a central section or zone 142 corresponding to the standard tolerance. Arm 138 is adjusted by knob 144 so that the range plate can be located at any position along the scale. When the zero or neutral position of pointer 130 has been set to correspond to the pre-weld thickness of the group or set of elements, the range plate is then adjusted to such position that the center of the tolerance zone corresponds to the proper post-weld thickness of the joint. Consequently, when the operator produces a weld in the usual fashion he merely looks at the voltmeter, and the position of the pointer in or out of the tolerance zone will tell him immediately whether or not the part is satisfactory.

If visible or audible signaling is desired it may be accomplished in the manner indicated in FIGURES 6 and 7. Signal lights 146 and 148 will be actuated by means to be described to indicate, respectively, final thickness above or below the tolerance range. Similarly, horns or buzzers 150 and 152 will be actuated to indicate final thickness above or below the tolerance range. The two types of signals may be used jointly or alternatively as desired.

A system for actuating these signals is indicated schematically in FIGURE 7. Arm 138 carries a signal plate 154 with "high" and "low" contact zones 156 and 158 adapted to cooperate in producing signals indicating that final thickness is above or below the tolerance range. Pointer 130 carries a contact button 160 and is also connected by conductor 162 through battery 164 to ground. If the pointer stops in the "high" area, button 160 will engage contact zone 156 and current will flow through conductor 166 to relay 168 and thence to ground. The relay will then actuate the "high" signal or signals 146, 150 by way of conductor 170 and other circuitry not shown. Similarly, if the pointer stops in the "low" area, it will actuate one or both of signals 148, 152 through contact zone 158, conductor 172, relay 174, and conductor 176. Switches are provided as necessary to include or exclude the signalling devices in the circuitry.

While it is common practice in the welding field of the electronics industry to limit the allowable gross magnitude of weld deformation, or minimum thickness of the welded joint, this has been done only to prevent or avoid a condition known as "mashed welds" which are so distorted as to be unrealiable. So far as known, there has been no previous use or knowledge of the method of determining the final thicknesses of weld joints and comparing them with each other and with a standard to determine their conformity, thus using the thickness measurement in effect as a quantitative indicator of the strength of the weld joint.

The method described above can also be used in the inspection of purchased components of modules to determine the quality and weldability of the conductive elements. This may be done by welding the tips of the wires and measuring as above described. If the weld spots are satisfactory it is at least a strong indication that the welding in the component is satisfactory. The welded tips can now be snipped off and discarded, leaving the leads free as before. Obviously a pull test could not be applied to such an assembly.

The present method also provides a convenient way of checking a new or replacement welding head with minimum effort. Samples of identical wire are welded in the production head which is known to be operating as desired and the head to be checked. If the final thickness is the same, the new head is ready for use.

It will be apparent to those skilled in the art that various changes and modifications may be made in the construction and operation as disclosed without departing from the spirit of the invention and it is intended that all such changes and modifications shall be embraced within the scope of the following claims.

We claim:

1. Apparatus for making and substantially simultaneously determining the quality of a resistance welded joint between a plurality of thin electrically conductive elements, comprising: a support; a first electrode carried by said support and having a welding contact tip; a second electrode having a welding contact tip and movably carried by said support to move its tip toward and away from the tip of said first electrode; means to apply a predetermined force to said second electrode to produce a predetermined clamping force to a plurality of elements to be welded in the welding zone between said points; means to apply a measured quantity of electrical energy to the elements in said welding zone to cause local heating, melting, and metal flow under pressure resulting in a fused weld which is thinner than the total thickness of the elements prior to the welding operation; means operatively connected to the second electrode to determine its position under pressure prior to the welding operation and subsequent to the welding operation to measure the reduction in thickness of the welded joint; and means cooperating with said last mentioned means to indicate whether or not the thickness reduction of the joint is within the allowable limits of a predetermined quality standard.

2. Apparatus as claimed in claim 1; said position determining means comprising a dial indicator having an axially movable shaft in contact with the movable electrode, a scale, and an indicator movable along the scale in response to movement of said shaft.

3. Apparatus as claimed in claim 1; said indicating means including an adjustable reference member bearing a visible zone of thickness reduction allowability.

4. Apparatus as claimed in claim 1; said position determining means comprising a linear differential transformer having an axially movable armature in contact with the movable electrode; a source of energy for said transformer; and a voltmeter to indicate the voltage output of said transformer.

5. Apparatus as claimed in claim 4; said indicating means including a pair of signal lights actuated by signals from said differential transformer to indicate thickness reductions below and above the allowability range.

6. Apparatus as claimed in claim 4; said indicating means including a pair of audible signal devices actuated by signals from said differential transformer to indicate thickness reductions below and above the allowability range.

7. A method of resistance welding comprising positioning a plurality of elements between a pair of electrodes, applying a predetermined clamping force to the positioned elements through the electrodes, applying a predetermined quantity electrical energy to the clamped elements thereby producing a reduction in thickness of the clamped elements as a result of localized heating and metal deformation, sensing the reduction of thickness of the clamped elements occurring during the welding operation and generating a signal proportional thereto, and utilizing the generated signal to indicate the quality of the weld.

8. An apparatus for making resistance welds comprising a pair of electrodes mounted for relative movement with respect to each other, means for applying through said electrodes a clamping force to a plurality of elements to be disposed between said electrodes, means for connecting said electrodes to a source of electrical energy to cause local heating and fusion of the clamped elements resulting in a fused weld which is thinner than the total thickness of the elements prior to the welding operation, and means for sensing the reduction in thickness occurring during the welding operation and generating a signal proportional thereto.

9. An apparatus as described in claim 8 including means actuated by said generated signal to indicate the quality of the weld.

10. An apparatus for testing the quality of a joint which has been formed by application of heat and pressure comprising means for measuring the reduction in dimension of the parts joined as the result of application of heat and pressure forming the joint, and means responsive to said measured reduction of the joint for indicating the quality of the joint.

11. An apparatus as defined in claim 10, further comprising a movable member which moves proportionally to the reduction in dimension of the parts being joined as the joining occurs and means for sensing the extent of movement of said member whereby the measurement for testing of the joint can be performed as the joint is formed.

12. An apparatus as defined in claim 10, further comprising means for generating a signal proportional to the measured reduction of the joined parts and indicator means operated by said signal for indicating the quality of the joint.

13. A method for determining the quality of a joint between a plurality of workpieces joined by applying pressure and heat to the workpieces comprising measuring the reduction of thickness of the welded parts at their connection resulting from the joining operation and comparing the reduction to a standard reduction which has been predetermined to provide a joint of acceptable quality.

References Cited

UNITED STATES PATENTS

| | | | |
|---|---|---|---|
| 1,967,094 | 7/1934 | Lincoln | 219—86 |
| 1,975,753 | 10/1934 | Delano | 219—110 |
| 2,467,090 | 4/1949 | Martin | 219—86 |
| 2,473,772 | 6/1949 | Vang. | |
| 2,472,368 | 6/1949 | Cox | 219—86 |
| 2,851,584 | 9/1958 | Sciaky | 219—86 |

RICHARD M. WOOD, *Primary Examiner.*

P. W. MAY, *Assistant Examiner.*

U.S. Cl. X.R.

219—86